United States Patent
King (10) Patent No.: US 10,604,058 B1
(45) Date of Patent: Mar. 31, 2020

(54) LASHING PAWL

(71) Applicant: T. Christopher King, Keller, TX (US)

(72) Inventor: T. Christopher King, Keller, TX (US)

(73) Assignee: BNSF Logistics, LLC, Springdale, AR (US)

( * ) Notice: Subject to any disclaimer, the term of this patent is extended or adjusted under 35 U.S.C. 154(b) by 0 days.

(21) Appl. No.: 16/199,812

(22) Filed: Nov. 26, 2018

(51) Int. Cl.
  *B60P 7/08* (2006.01)

(52) U.S. Cl.
  CPC .................................. *B60P 7/0823* (2013.01)

(58) Field of Classification Search
  CPC .. B60P 7/0823; B60P 7/06; B60P 7/08; B60P 7/0807
  USPC .................................................... 410/96, 101
  See application file for complete search history.

(56) References Cited

U.S. PATENT DOCUMENTS

| | | | |
|---|---|---|---|
| 2,322,576 A | 6/1942 | Huebshman et al. | |
| 2,591,986 A | 4/1952 | Weiss et al. | |
| 2,709,616 A * | 5/1955 | Larson | F16G 15/06 294/82.1 |
| 3,070,042 A | 12/1962 | Dunlap | |
| 3,252,681 A | 5/1966 | Watts | |
| 3,690,712 A | 9/1972 | Bahrman | |
| 3,709,455 A | 1/1973 | Last | |
| 3,843,081 A | 10/1974 | Meier et al. | |
| 4,606,687 A * | 8/1986 | Mantela | B60P 3/079 24/300 |
| 5,000,634 A * | 3/1991 | Ducote | B63B 3/70 24/287 |
| 5,106,247 A * | 4/1992 | Hove | B60P 7/13 410/73 |
| 5,348,433 A * | 9/1994 | Watson | B60P 7/0807 24/663 |
| 6,282,879 B1 * | 9/2001 | Bonaiti | F16G 15/06 59/86 |
| 6,527,487 B2 | 3/2003 | Adams | |
| 7,413,390 B1 * | 8/2008 | Allison, Jr. | B60P 7/0807 410/102 |
| 7,849,580 B2 | 12/2010 | Barry et al. | |
| 8,756,955 B2 * | 6/2014 | Walchle | F16B 45/00 24/573.11 |
| 9,452,647 B2 | 9/2016 | Bowe | |
| 9,499,237 B1 | 11/2016 | Hsieh | |
| 10,072,698 B2 | 9/2018 | Pautsch et al. | |
| 2001/0022922 A1 * | 9/2001 | Hornady | B60P 7/0807 410/47 |
| 2007/0212185 A1 * | 9/2007 | Frett | B60P 7/0807 410/97 |
| 2016/0101933 A1 * | 4/2016 | Walker | B65D 90/0013 410/82 |
| 2020/0001768 A1 * | 1/2020 | Andre | B60P 3/079 |

* cited by examiner

*Primary Examiner* — Hilary L Gutman

(74) *Attorney, Agent, or Firm* — Dan Brown Law Office; Daniel R. Brown (57) ABSTRACT

A lashing pawl for engaging a hole in member to retainably engage a lashing line thereto, and thereby facilitate lashing the member to a fixture or vehicle, wherein the member has a distal face and a proximal face spaced apart by a depth of the hole, and wherein the lashing pawl includes a pin hole formed therethrough for engaging the lashing line, and an engagement face that engages the distal face of the member to retain the lashing pawl in place.

18 Claims, 5 Drawing Sheets

LASHING PAWL

BACKGROUND OF THE INVENTION

Related Applications

None.

Field of the Invention

The present invention relates to securing loads for transportation using lashing lines. More particularly, the present invention relates to a lashing pawl with an engagement face that is retained in a hole of a member, which is useful in many loading and lading applications, and particularly useful for lashing wind turbine tower sections to transportation vehicles such as railcars, or other fixtures, by engaging a bolt hole in a flange.

DESCRIPTION OF THE RELATED ART

The prior art processes and apparatus for securing wind turbine tower sections to transportation vehicles such as railcars, or fixtures, included bolting tie down plates to the flanges at each end of a tower section using a bolt, washer, and nut set. The tie down plates serve as a connection points that are lashed to the railcar, for example, using lashing lines. This is necessary to prevent the tower section from rolling off the railcar, or railcar fixture, during transport. Similar lashing techniques are employed for a wide range of cargo carried on a wide range of vehicles and loading fixtures, as are known to those skilled in the art.

Figure 1:
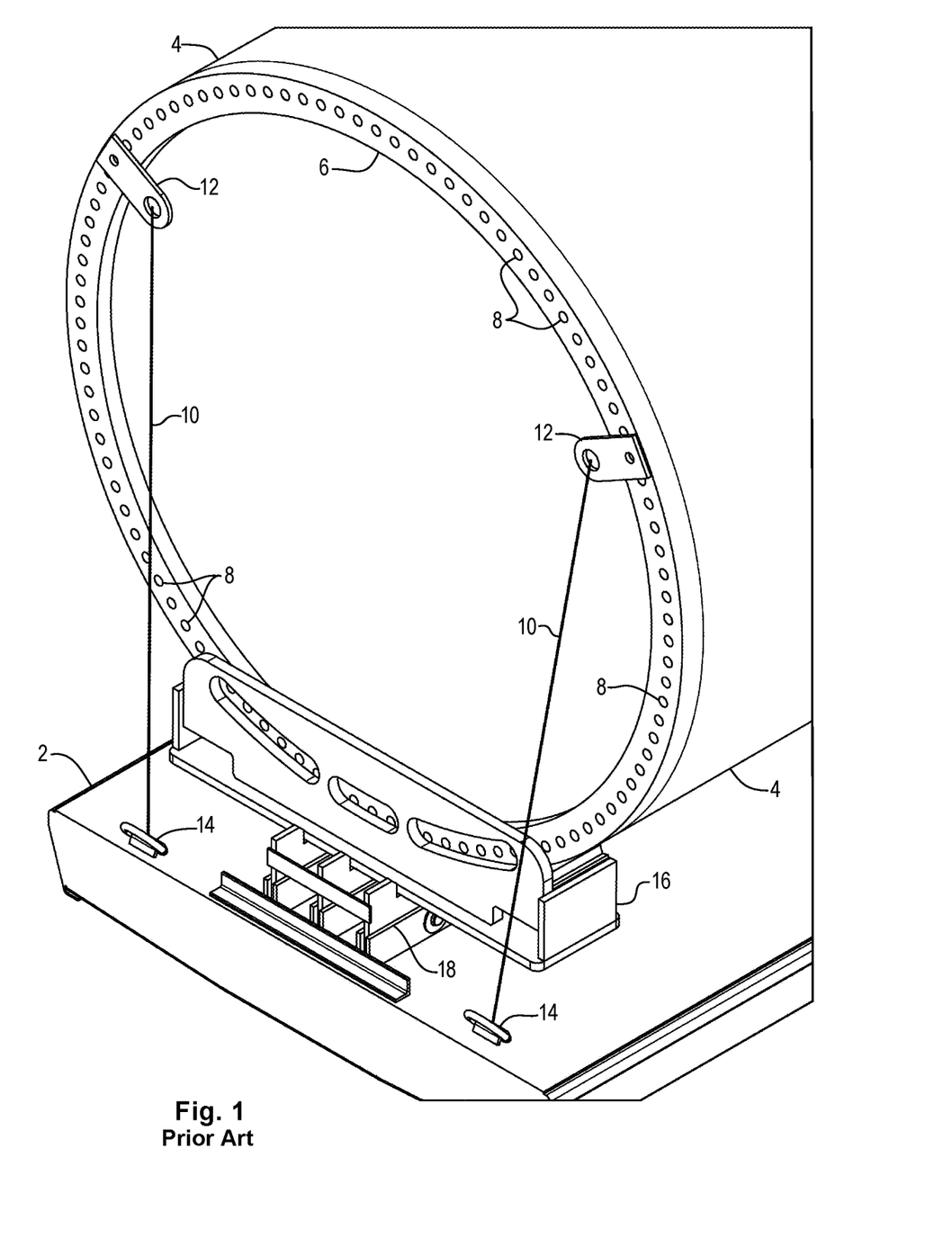
FIG. 1 is a prior art drawing of a wind turbine tower section lashed to a railroad flatcar.

FIG. 1 is a prior art drawing of a wind turbine tower section 4 lashed to a railroad flatcar 2. The tower section 4 has a flange 6 at the end, which has many bolt holes 8 formed there through. In this illustration, two tie down plates 12 are bolted to the flange 6 (bolt, washer, and nut are not illustrated). Lashing lines 10 are connected between the tide down plates 12 and lashing rings 14 that are fixed to the railcar 2. The lashing lines may be chain, cable, rope, or other suitable line material. The lashing lines 10 are tightened to secure the tower section 4. The tower section 4 may also be secured using a suitable foot stop 18 and mounting bracket 16, as are known to those skilled in the art.

The prior art bolted flange plate assemblies are quite large. Furthermore, the fastening points are typically located high on the railcar, making the attachment process awkward. Additionally, tower ends are normally covered with protective tarpaulins, which interfere with access for connecting the bolt sets. This requires provisions for gaining access to the flange holes on the tower section, which is time consuming and may damage the tarpaulins. Thus it can be appreciated that there is a need in the art for improved systems and methods for lashing loads to carriage vehicles and fixtures.

SUMMARY OF THE INVENTION

The need in the art is addressed by the apparatus and methods of the present invention. The present disclosure teaches a lashing pawl for retainably engaging a lashing line to a hole in a member, where the member has a distal face and a proximal face spaced apart by a depth of the hole. The lashing pawl includes a bar having a length between a distal end and a proximal end, and a tang extending from the proximal end of the bar, where the tang has a pin hole formed through it for engaging the lashing line. The bar also has an engagement face adjacent to the distal end, and, the bar and engagement face are proportioned to pass through the hole. The tang and the engagement face are spaced a distance apart that is greater than the depth of the hole such that the engagement face may retainably engage the distal face of the member. When tension force, having a lateral component, is applied at the pin hole, it urges the bar against the member adjacent the proximal face, thereby creating a fulcrum point that further urges and maintains the engagement face in contact against the distal face of the member, and thereby further retains the lashing pawl in place against the tension force.

In a specific embodiment of the forgoing lashing pawl, the engagement face is oriented to be substantially parallel to the distal face of the member while the engagement face is engaged therewith. In another specific embodiment, where the member is a flange and the hole is a round bolt hole, and the bar is fabricated from rectangular steel bar stock with rounded edges that facilitate insertion into the round bolt hole.

In a specific embodiment, the forgoing lashing pawl further includes a shackle with clevis pin, and the shackle is engaged with the tang by inserting the clevis pin through the pin hole, and the lashing line is joined to the shackle.

In a specific embodiment of the forgoing lashing pawl, the bar is bent at an obtuse angle along the length. In another specific embodiment, the bar is curvilinear along the length.

In a specific embodiment of the forgoing lashing pawl, the tang is proportioned such that it will not pass through the hole in the member. In another specific embodiment, the tang is a generally cylindrical extension of the bar with the pin hole disposed between opposing parallel faces of the cylindrical extension. In a refinement to this embodiment, the cylindrical extension is laterally offset from the bar in a direction opposite the engagement face to thereby form a crook adjacent the fulcrum point.

The present disclosure also teaches a method of engaging a lashing line to a hole in a member, where the member has a distal face and a proximal face spaced apart by a depth of the hole, using a lashing pawl that includes a bar having a length between a distal end and a proximal end, and a tang extending from the proximal end that has a pin hole formed through it, and wherein the bar has an engagement face adjacent to the distal end, and wherein the tang and the engagement face are spaced a distance apart that is greater than the depth of the hole. The method includes the steps of engaging the lashing line to the pin hole, passing the distal end of the bar and the engagement face through the hole in the member, and engaging the engagement face with the distal face of the member. Then, applying a tension force, which has a lateral component, to the pin hole, through the lashing line, thereby urging the bar against the member adjacent the proximal face for the member, and thereby creating a fulcrum point urging and maintaining the engagement face against the distal face of the member, and thereby retaining the lashing pawl in place against the tension force.

In a specific embodiment, the foregoing method further includes orienting the engagement face substantially parallel to the distal face of the member while the engagement face is engaged therewith.

In a specific embodiment of the foregoing method, wherein the member is a flange and the hole is a round bolt hole, and wherein the bar is fabricated from rectangular steel bar stock with rounded edges, to thereby facilitating insertion of the bar into the round bolt hole.

In a specific embodiment, the foregoing method further includes engaging a shackle to the pin hole in the tang by inserting a clevis pin of the shackle through the pin hole, and joining the lashing line with the shackle.

In a specific embodiment of the foregoing method, the bar is bent at an obtuse angle along its length. In another specific embodiment, the bar is curvilinear along its length.

In a specific embodiment of the foregoing method, the tang is proportioned such that it will not pass through the hole in the member. In another specific embodiment, the tang is a generally cylindrical extension of the bar with the pin hole disposed between opposing parallel faces of the cylindrical extension. In a refinement to this embodiment, the cylindrical extension is laterally offset from the bar in a direction opposite the engagement face thereby forming a crook at the fulcrum point.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components, and method steps, have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The principles of the present disclosure are embodied in a novel lashing pawl that consists of a bar that is inserted through hole in a member, such as a bolt hole in a flange, with an engagement face, and a tang for connecting a lashing line, which together transfer the tension in a lashing line to cause the engagement face to engage the member in a ratchet pawl fashion to retain the lashing line in tensile engagement with the member. This arrangement is particularly useful for lashing a load to a transportation vehicle or fixture. In an illustrative embodiment, the lashing pawl is used to secure the ends of a wind turbine tower section to corresponding tie down lashing rings fixed to a railcar.

The use of the lashing pawl minimizes both the amount of time and tools required to complete the task of lashing a load. Illustrative embodiments of tower lashing pawls embodying these principles are shown in the accompanying drawings. In particular, each securement plate with bolt, washer, and nut sets used in prior art securement systems is replaced by securing a lashing pawl with engagement face to a hole in whatever cargo is to be secured to a transportation vehicle or fixture. For example, the lashing pawl may be inserted through a bolt hole in a flange, and with the assistance of gravity and a tensioned lashing line, the engagement face engages a surface adjacent to the tower flange's bolt hole, thereby securing the lashing pawl in place. No tools are required to perform this action.

In an illustrative embodiment, the simplified lashing pawl consists of a one inch thick bar cut from high strength steel, and a ¾" shackle. The concept behind this lashing pawl is simplicity and cost savings. The basic instructions for use consist of inserting the lashing pawl through hole in tower flange, allowing it to pass through until the engagement face engages with the inside, also referred to as the distal surface, of the tower flange. Then, looping a chain through a shackle connected a tang on the proximal end of the lashing pawl, and securing the load to the railcar. The weight of the chain ensures that the lashing pawl engagement face remains in engaged orientation with the flange of the load. When the lashing pawl is to be removed, the operator simply release the chain tension and withdraws the lashing pawl through the bolt hole.

Figure 2:
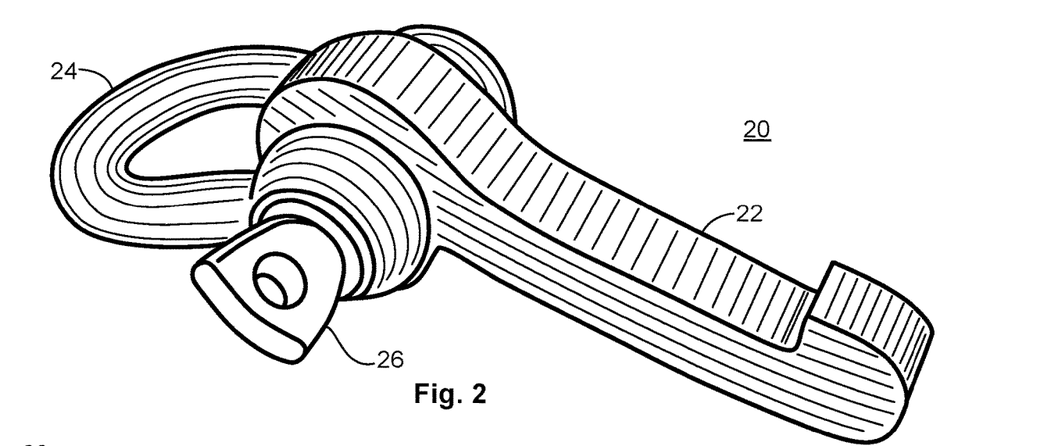
FIG. 2 is perspective view drawing of a lashing pawl with shackle attached according to an illustrative embodiment of the present invention.
Figure 3:
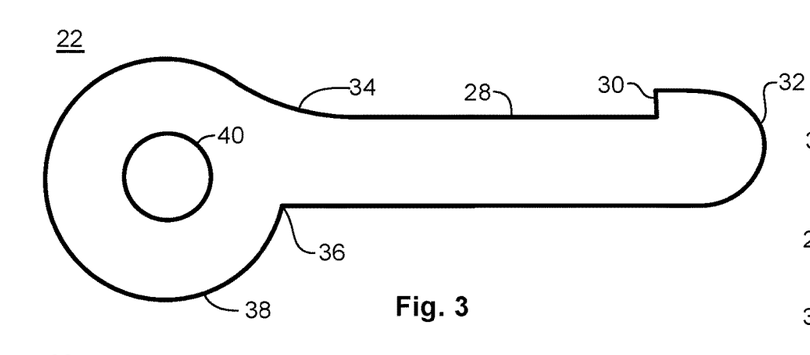
FIG. 3 is a side view drawing of a lashing pawl according to an illustrative embodiment of the present invention.
Figure 4:
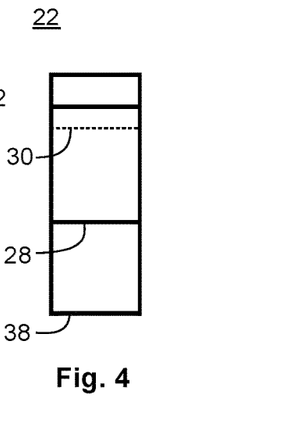
FIG. 4 is an end view drawing of a lashing pawl according to an illustrative embodiment of the present invention.
Figure 5:
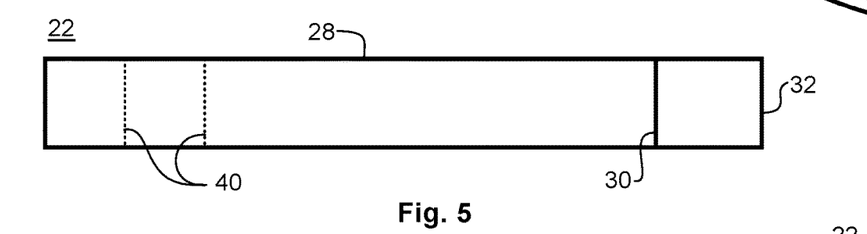
FIG. 5 is a top view drawing of a lashing pawl according to an illustrative embodiment of the present invention.
Figure 6:
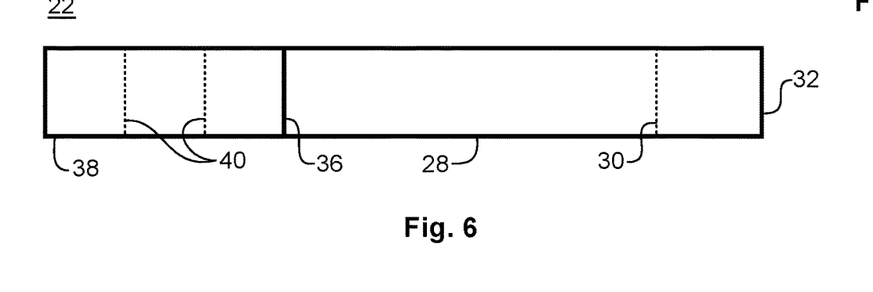
FIG. 6 is a bottom view drawing of a lashing pawl according to an illustrative embodiment of the present invention.

Reference is directed to FIG. 2, which is perspective view drawing of a lashing pawl assembly 20 with shackle 24 attached according to an illustrative embodiment of the present invention. The assembly 20 consists of a lashing pawl 22 and a shackle 24 that is secured to the lashing pawl 22 by a clevis pin 26. A lashing line (not shown) is connected to the shackle 24 in the various manners known to those skilled in the art. In alternative embodiments, the lashing line may be connected directly to the lashing pawl.

Reference is directed to FIGS. 3, 4, 5, and 6, which are as a side view, end view, top view, and bottom view drawing, respectively, of a lashing pawl 22 according to an illustrative embodiment of the present invention. In this embodiment the lashing pawl is fabricated from high strength steel, such as by cutting it from ¾″ steel plate, although other fabrication techniques, materials, and material thicknesses could also be employed. The lashing pawl 22 is formed as a length of bar 28 extending from a tang 38 at a proximal end 34 of the bar 28 to a distal end 32 of the bar 28. The tang 38 in this embodiment is a generally cylindrical member with a pin hole 40 formed therethrough. The tang 38 is inserted into the shackle (see FIG. 2) and is retained in place by inserting the clevis pin (see FIG. 2) through the pin hole 40.

The lashing pawl 22 in FIG. 3 through 6 has an engagement face 30 formed adjacent the distal end 32 of the bar 28. The engagement face 30 is generally orthogonal to the length of the bar 28, or its longitudinal axis, but is should be noted that the engagement face performs well when it is oriented in parallel with the surface on the load with which is is engaged during loading and transport. An orientation that should be avoided is one where the engagement face serves as an inclined plane that urges the engagement face off of an engagement surface under tension of an attached lashing line. The tang 38 at the proximal end of the bar 28 is sized so that it will not fit through the hole (not shown) with which the lashing pawl 22 is engaged. In this illustrative embodiment, a crook 36 is formed at the juncture between the proximal end of the bar 28 and the tang 38, which may also serve as a fulcrum point that transfers tension on an attached lashing line (not shown) into a moment that urges the engagement face into engaged orientation with the load that is being lashed to the transportation vehicle or fixture, as will be more fully described hereinafter.

Figure 7:
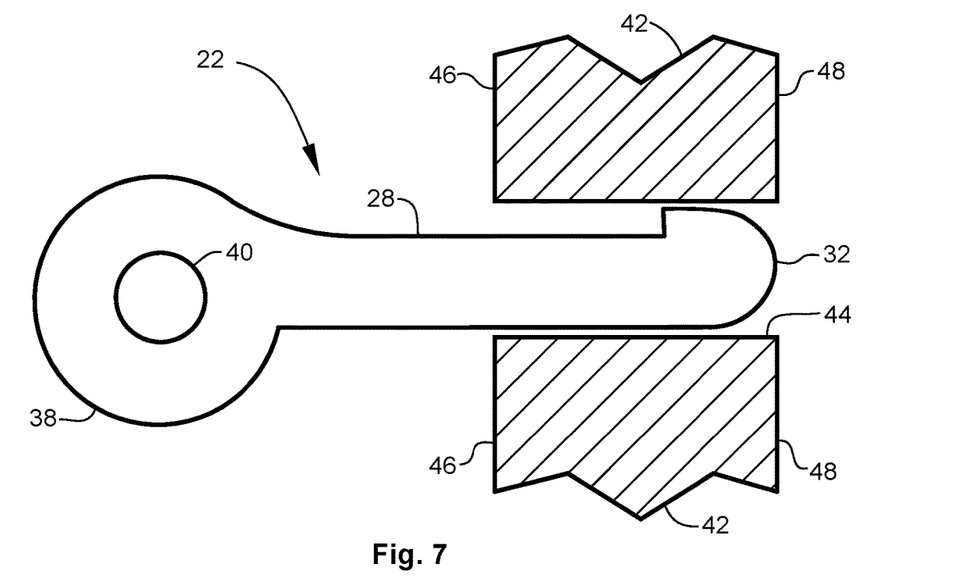
FIG. 7 is a drawing of a lashing pawl being inserted into a hole in a member according to an illustrative embodiment of the present invention.

Reference is directed to FIG. 7, which is a drawing of a lashing pawl 22 being inserted through a hole 44 in a member 48 according to an illustrative embodiment of the present invention. This drawing illustrates the proportions of the lashing pawl bar 28, engagement face 30, and distal end 32 as compared to the size of the hole 44 through which it is inserted, and shows that it must fit through the hole 44 in the member 42. Note that the member 42, such as a flange, has a proximal face 46 and a distal face 48. The length of the bar 28 must be long enough that the engagement face 30 passes through the hole 44 and past the distal surface 48 of the member 42. Also note that the tang 28 is larger then the hole 44 to prevent the lashing pawl 22 from passing all the way through.

Figure 8:
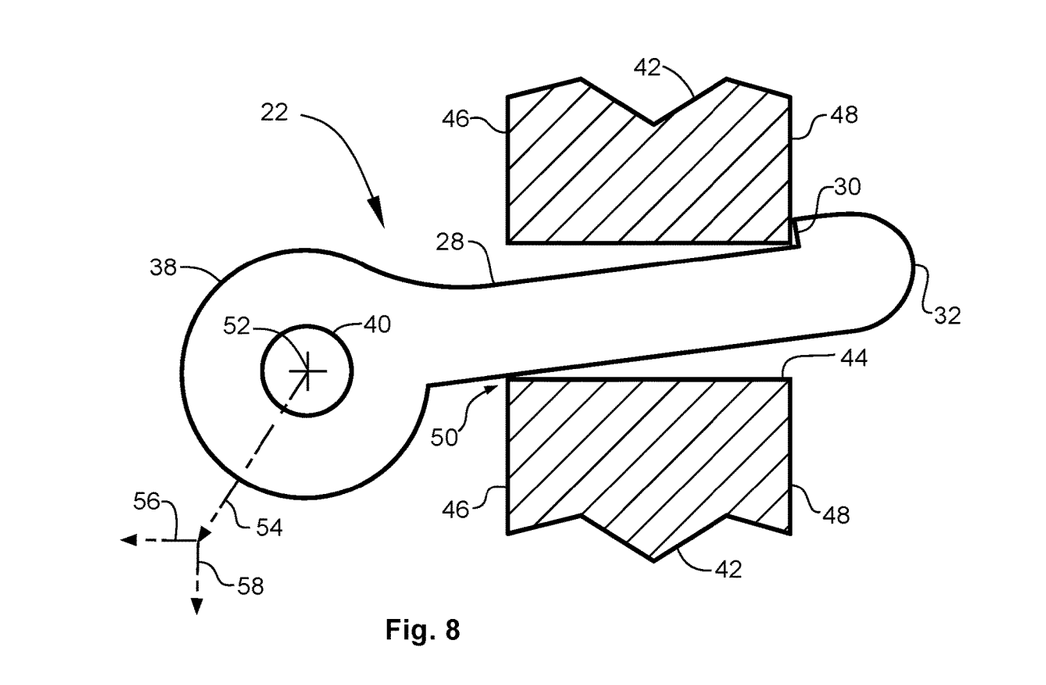
FIG. 8 is a drawing of a lashing pawl engaged with a hole in a member according to an illustrative embodiment of the present invention.

Reference is directed to FIG. 8, which is a drawing of a lashing pawl 22 engaged with a hole 44 in a member 42 according to an illustrative embodiment of the present invention. In this drawing, the engagement face 30 is engaged with the distal face 48 of the member 42 adjacent the hole 44 therein. Note that tension force 54 on the lashing line (not shown), which is applied at the center 52 of the pin hole 40 by the clevis pin (not shown), comprises both a longitudinal force component 56 and a lateral force component 58. It is the lateral force component 58 that urges the lashing pawl bar 28 against the proximal face 46 of the member at the hole 44 opening, thereby creating a fulcrum point 50, which induces a moment force about the fulcrum 50 that urges the engagement face 30 to engage and maintain engagement with the distal face 48 of the member 42. This arrangement establishes a locking pawl action as occurs in the common ratchet, and as such, the engagement face 30 functions as the pawl in a ratchet so long as the lateral force component 58 is present, and this is maintained in practice by tension on the lashing line (not shown).

Figure 9:
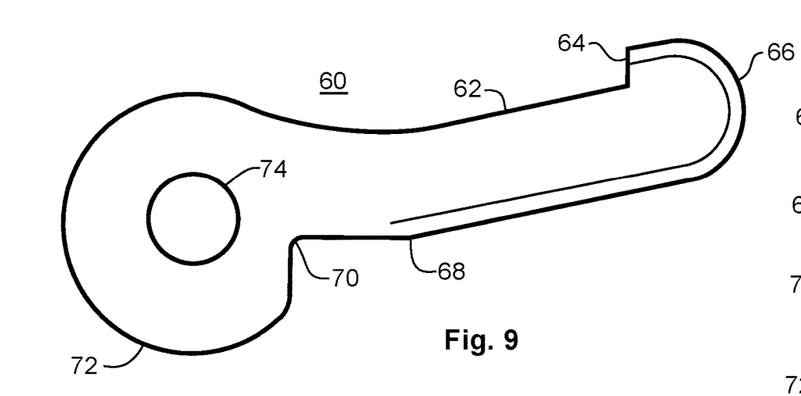
FIG. 9 is a side view drawing of a lashing pawl according to an illustrative embodiment of the present invention.
Figure 10:
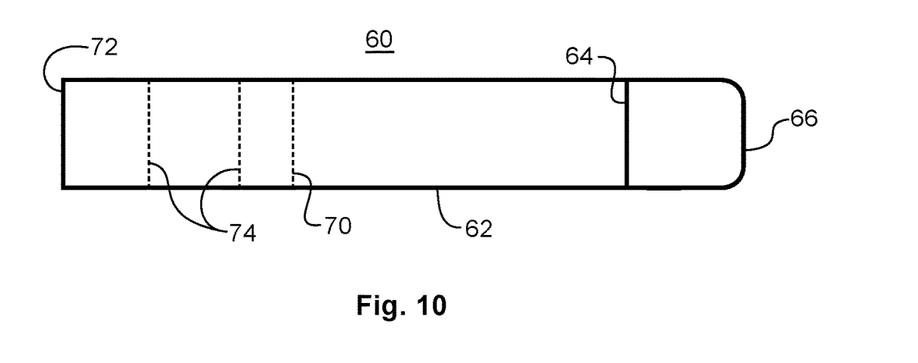
FIG. 10 is an top view drawing of a lashing pawl according to an illustrative embodiment of the present invention.
Figure 11:
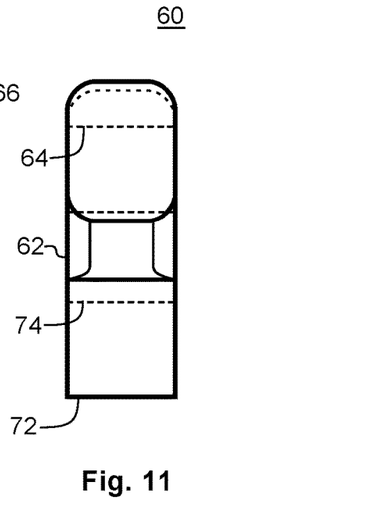
FIG. 11 is a end view drawing of a lashing pawl according to an illustrative embodiment of the present invention.

Reference is directed to FIGS. 9, 10, and 11, which are a side view, top view, and end view drawing, respectively, of a lashing pawl 60 according to an illustrative embodiment of the present invention. In similar fashion with the previous embodiment, the present embodiment includes an elongated bar 62 with an engagement face 64 adjacent its distal end 66, and a tang 72 formed at the bar's 62 proximal end (near 70). The tang 72 has a pin hole 74 formed through it. In this embodiment, the bar 62 has a bend 68 that alters the angle of the lashing pawl, and also requires an adjustment to the engagement face 64 angle to ensure that it will be substantially parallel with the surface it engages during use. Generally, an obtuse angle is employed. The bend 68 could also be implemented as a curved, or curvilinear, shape of the bar 62. The curved or bent bar facilities fitment of the lashing pawl 60 through a hole (not shown), and also reduces the amount of material required to implement the apparatus, which is particularly useful in larger diameter holes, as compared to the size of the bar 62 itself. Note that this lashing pawl 60 also has an oversized tang 72 that will not fit into the hole it is engaged with, and that there is also a crook 70 formed at the junction between the bar 62 and the tang 72. Additionally, note that the bar 62 and distal end 66 have rounded edges to facilitate fitment of the lashing pawl 60 into a hole in a member (not shown).

Figure 12:
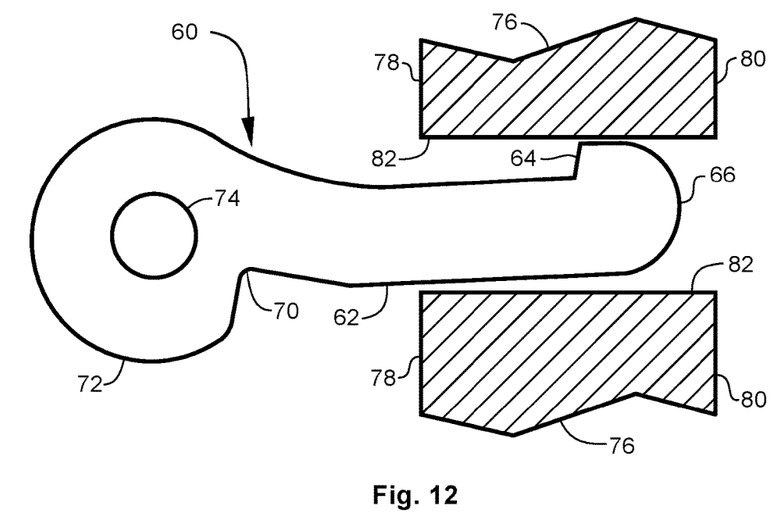
FIG. 12 is a drawing of a lashing pawl being inserted into a hole in a member according to an illustrative embodiment of the present invention.
Figure 13:
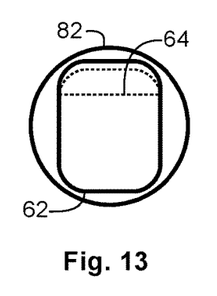
FIG. 13 is an end view drawing of a lashing pawl being inserted into a hole in a member according to an illustrative embodiment of the present invention.

Reference is directed to FIGS. 12 and 13, which are a side view and end view drawing, respectively, of a lashing pawl 60 being inserted into a hole 82 in a member 76 according to an illustrative embodiment of the present invention. This drawing illustrates the proportions of the bent or curved lashing pawl bar 62, engagement face 64, and distal end 66 as compared to the size of the hole 82 through which it is inserted, and shows that it will 'fit' through the hole 82 in the member 76. Note that the member 76, such as a flange, has a proximal face 78 and a distal face 80. The length of the bar 62 must be long enough that the engagement face 64 passes through the hole 82 and past the distal surface 80 of the member 76. Also note that the tang 72 is larger then the hole 82 to prevent the lashing pawl 60 from passing all the way through. Note that in this embodiment, the size of the bar 62 is considerably smaller than the size of the hole 82, and that the bend or curve 62 facilitates proper fitment of the lashing pawl 60 within the hole 82. Note further that the squared edges of the bar 62 may be rounded off (FIG. 13) to enhance fitment.

Figure 14:
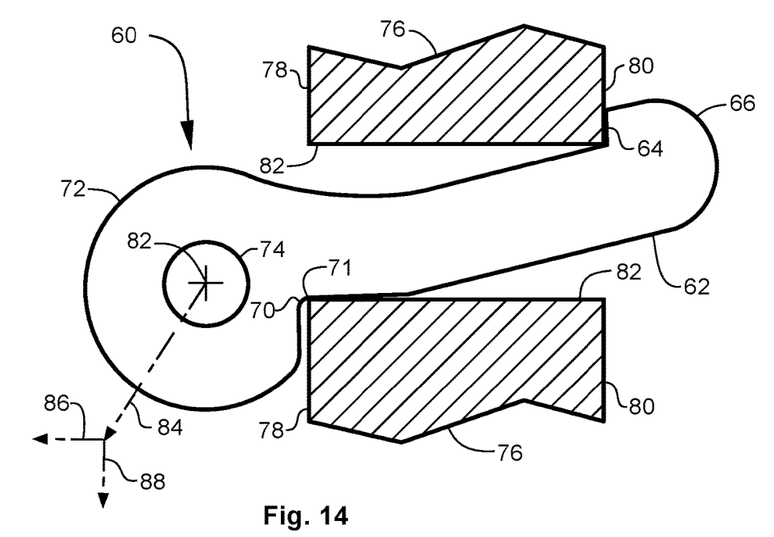
FIG. 14 is a drawing of a lashing pawl engaged with a hole in a member according to an illustrative embodiment of the present invention.

Reference is directed to FIG. 14, which is a drawing of a lashing pawl 60 fully engaged with a hole 82 in a member 76 according to an illustrative embodiment of the present invention. In this drawing, the engagement face 64 is engaged with the distal face 80 of the member 76 adjacent the hole 82 therein. Note that tension force 84 on the lashing line (not shown), which is applied at the center 82 of the pin hole 74 by the clevis pin (not shown), comprises both a longitudinal force component 86 and a lateral force component 88. It is the lateral force component 88 that urges the lashing pawl bar 62 against the proximal face 78 of the member at the hole 82 opening, thereby creating a fulcrum point 71 at drop 70, which induces a moment force about the fulcrum 71 that urges the engagement face 65 to engage and maintain engagement with the distal face 80 of the member 76. This arrangement establishes a locking pawl action, and as such, the engagement face 64 functions as the pawl in a ratchet so long as the lateral force component 88.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A lashing pawl system for retainably engaging a lashing line to a hole, which is round and has a diameter, in a member, the member having a distal face and a proximal face spaced apart by a depth of the hole, wherein the depth of the hole is greater than the diameter of the hole, the lashing pawl comprising:
   a bar, which is elongated in proportions, having a length between a distal end and a proximal end, wherein said length is greater than a width of said bar and greater than the diameter of the round hole;
   a tang extending from said proximal end of said bar, and having a pin hole formed therethrough for engaging the lashing line;
   said bar having an engagement face adjacent said distal end, and wherein
   said bar and engagement face are proportioned to pass through the diameter of hole, and wherein
   said tang and said engagement face are spaced a distance apart that is greater than the depth of the hole such that said engagement face may retainably engage the distal face of the member, and wherein
   tension force having a lateral component applied at said pin hole urges said bar against the member adjacent the proximal face, thereby creating a fulcrum point that urges and maintains said engagement face against the distal face of the member, and thereby retains the lashing pawl in place against said tension force.

2. A lashing pawl system of claim 1, and wherein:
   said engagement face is oriented to be substantially parallel to the distal face of the member while said engagement face is engaged therewith.

3. A lashing pawl system of claim 1, wherein the member is a flange and the hole is a round bolt hole, and wherein:
   said bar is fabricated from rectangular steel bar stock with rounded edges.

4. A lashing pawl system of claim 1, further comprising:
   a shackle with clevis pin, and wherein
   said shackle is engaged with said tang by inserting said clevis pin through said pin hole, and wherein
   said lashing line is joined to said shackle.

5. A lashing pawl system of claim 1, and wherein:
   said bar is bent at an obtuse angle along said length.

6. A lashing pawl system of claim 1, and wherein:
   said bar is curvilinear along said length.

7. A lashing pawl system of claim 1, and wherein:
   said tang is proportioned such that it will not pass through the hole in the member.

8. A lashing pawl system of claim 1, and wherein:
   said tang is a generally cylindrical extension of said bar with said pin hole disposed between opposing parallel faces of said cylindrical extension.

9. A lashing pawl system of claim 8, and wherein:
   said cylindrical extension is laterally offset from said bar in a direction opposite said engagement face to thereby form a crook at said fulcrum point.

10. A method of engaging a lashing line to a hole, which is round and has a diameter, in a member, the member having a distal face and a proximal face spaced apart by a depth of the hole, wherein the depth of the hole is greater than the diameter of the round hole, using a lashing pawl that includes a bar, which is elongated in proportions, having a length between a distal end and a proximal end, wherein the length of the bar is greater than the width of the bar and greater than the diameter of the hole, and a tang extending from the proximal end that has a pin hole formed through it, and wherein the bar has an engagement face adjacent to the distal end, and wherein the tang and the engagement face are spaced a distance apart that is greater than the depth of the hole, and wherein the bar and engagement face are proportioned to pass through the diameter of the hole, the method comprising the steps of:
    engaging the lashing line to the pin hole;
    passing the distal end of the bar and the engagement face through the hole in the member,
    engaging the engagement face with the distal face of the member, and
    applying a tension force, which has a lateral component, to the pin hole, through the lashing line, thereby urging the bar against the member adjacent the proximal face, and thereby
    creating a fulcrum point urging and maintaining the engagement face against the distal face of the member, and thereby
    retaining the lashing pawl in place against said tension force.

11. The method of claim 10, further comprising the step of:
    orienting the engagement face substantially parallel to the distal face of the member while the engagement face is engaged therewith.

12. The method of claim 10, wherein the member is a flange and the hole is a round bolt hole, and wherein the bar is fabricated from rectangular steel bar stock with rounded edges, thereby facilitating insertion of the bar into the round bolt hole.

13. The method of claim 10, further comprising the steps of:
    engaging a shackle to the pin hole in the tang by inserting a clevis pin of the shackle through the pin hole, and joining the lashing line with the shackle.

14. The method of claim 10, and wherein the bar is bent at an obtuse angle along its length.

15. The method of claim 10, and wherein the bar is curvilinear along its length.

16. The method of claim 10, and wherein the tang is proportioned such that it will not pass through the hole in the member.

17. The method of claim 10, and wherein the tang is a generally cylindrical extension of the bar with the pin hole disposed between opposing parallel faces of the cylindrical extension.

18. The method of claim 17, and wherein the cylindrical extension is laterally offset from the bar in a direction opposite the engagement face thereby forming a crook at the fulcrum point.

\* \* \* \* \*